UNITED STATES PATENT OFFICE.

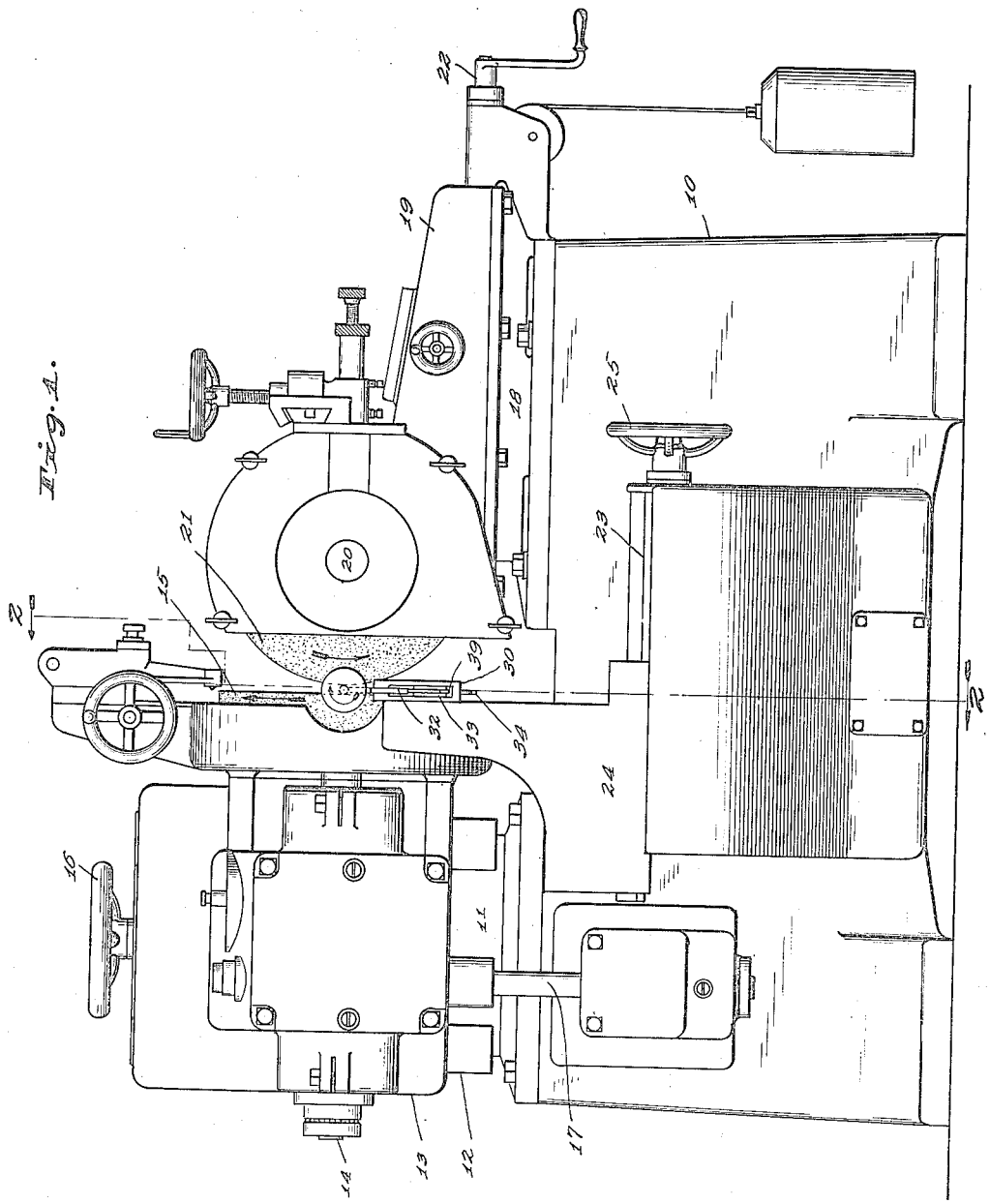

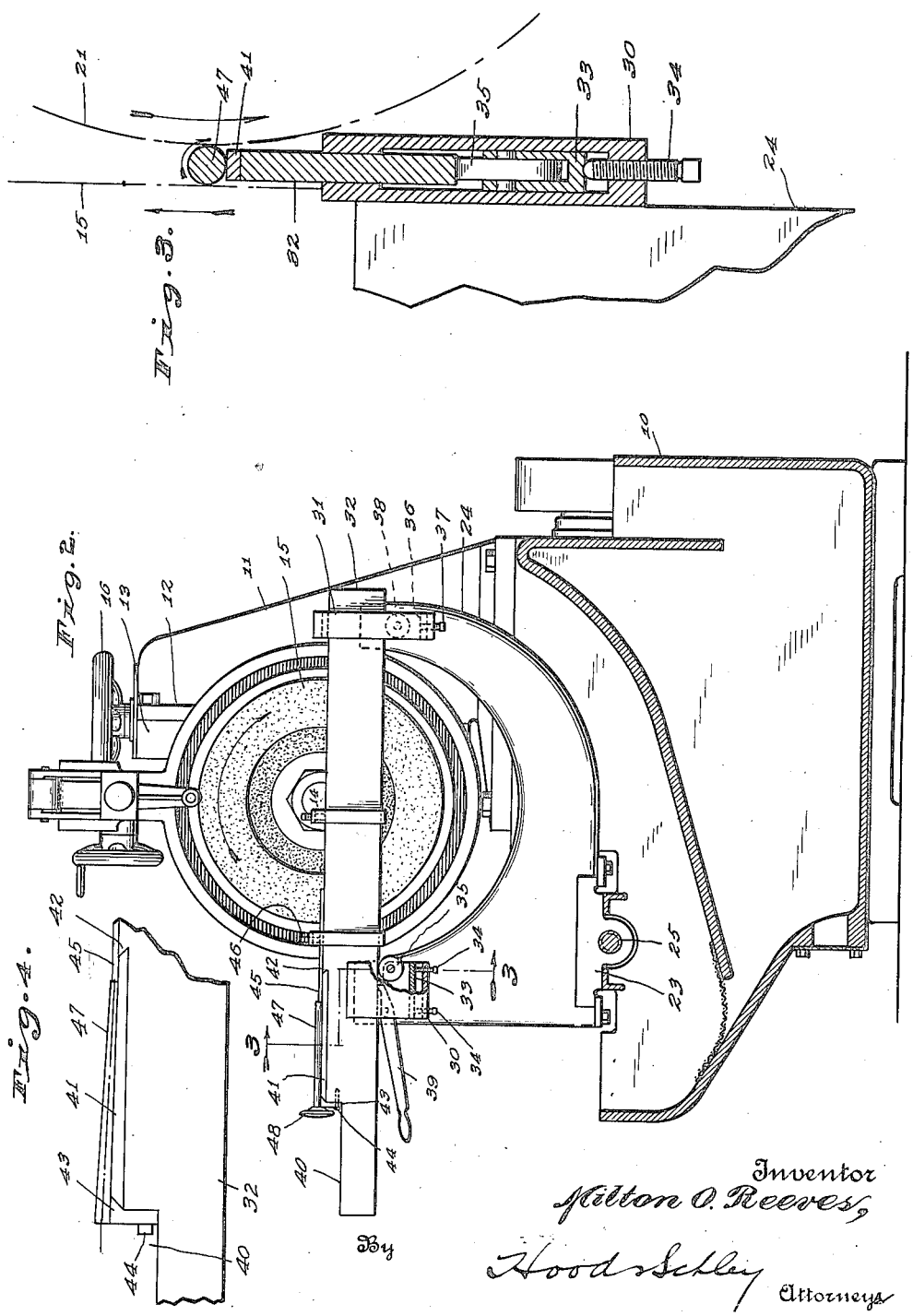

MILTON O. REEVES, OF COLUMBUS, INDIANA, ASSIGNOR TO REEVES PULLEY COMPANY, OF COLUMBUS, INDIANA, A CORPORATION OF INDIANA.

GRINDING MACHINE.

1,410,956.  Specification of Letters Patent.  Patented Mar. 28, 1922.

Application filed July 30, 1920. Serial No. 400,124.

*To all whom it may concern:*

Be it known that I, MILTON O. REEVES, a citizen of the United States, residing at Columbus, in the county of Bartholomew and State of Indiana, have invented a new and useful Grinding Machine, of which the following is a specification.

The object of my invention is to provide improved means for grinding cylindrical or conified objects, especially of those forms in which portions of the objects are of greater diameter than others, such, for instance, as valve stems, drill shanks, drill bodies etc.

The accompanying drawings illustrate my invention. Fig. 1 is a side elevation of a machine embodying my invention; Fig. 2 is a section on line 2—2 of Fig. 1; Fig. 3 a section on line 3—3 of Fig. 2 and on a larger scale; Fig. 4 a diagrammatic view somewhat exaggerated showing the wedge-shaped support for conified articles.

In the drawings, 10 indicates the main body of a machine supporting a vertical standard 11 having vertical guideways 12, upon which is vertically adjustable carriage 13, upon which is journaled shaft 14 of a controller wheel 15, having an active annular crown face. As is common in this type of machine, the wheel 15 is preferably of abrasive material. The carriage 13 may be vertically adjustable by the usual adjusting screw 16 and the wheel 15 is rotated in a direction indicated by the arrow through the medium of a shaft 17 at comparatively slow speed.

Mounted upon the main body 10 is a horizontal guideway 18, upon which is slidably mounted a carriage 19, movable in a line substantially parallel with the axis of shaft 14. Journaled upon carriage 19, substantially at right angles to shaft 14 and the direction of adjustability of carriage 19, is a shaft 20 which carries an abrasive wheel 21, having an active circumferential face. This wheel is provided, as is usual, with means, not shown, by which it may be driven in a direction indicated by the arrow at comparatively high speed. The carriage 19 is adjusted by means of screw 22. Also mounted upon the main body 10 upon ways 23 which are parallel with ways 18 is a work-supporting carriage 24, adjustable along ways 23 by screw 25.

Thus far, the construction is substantially the same as that shown in my copending application Serial No. 309,674, filed July 2, 1919.

Some classes of work are of such character as to not be readily automatically axially driven through the grinding throat formed between the wheels 15 and 21, or such as to make desirable the possibility of insertion or withdrawal of the articles laterally into or from the grinding throat, and my present invention is directed to mechanism designed for this purpose.

The carriage 24 is provided with a pair of accurately formed and vertically slotted jaws or holders 30, 31, in which is slidably mounted a work-supporting bar 32, said bar being supported in jaws 30 and 31, in such manner as to not only permit longitudinal movement of the bar, but also vertical movement of said bar at the work-supporting end. For this purpose, I mount in the jaw 30 a carrier 33 which is accurately vertically adjustable in jaw 30, by means of the screws 34 and carries a roller 35 upon which bar 32 rests. Mounted in jaw 31 is a similar carrier 36 supported on an adjusting screw 37 and carrying a roller 38 upon which bar 32 rests. Pivotally mounted in carrier 30 is a hand lever 39, one end of which may be brought into engagement with bar 32 so as to tilt the adjacent end of said bar upwardly. Bar 32 at its rear end is cut away as indicated at 40, and adjacent this point is provided preferably with a hardened work-receiving plate or bar 41, which may be conveniently held in place by having one beveled end inserted beneath the overhanging lip 42 and the other beveled end engaged by a plate 43 having an overhanging lip engaging the other beveled end of plate 41 and held in place by a screw or other suitable fastening means 44. A stop plate or finger 45 is adjustably mounted upon bar 32 so as to overlie the forward end of plate 41, and is held in desired adjusted position by screw 46. The bar 32 is, of course, slightly less in thickness than the diameter of that portion of the work to be operated upon.

Work to be operated upon, such, for instance, as the valve stem 47, is laid upon the plate 41 and carriers 30 and 36 are adjusted until the axis of the work is in the horizontal plane of the axis of shaft 20. The controlling wheel 15 is then vertically adjusted until its axis is slightly below the axis of shaft 20 the amount of variance determining the speed of the forwarding of the work through the throat of the machine.

The bar 32 is then shifted longitudinally over rollers 35 and 38, until the work is brought into engagement with the grinding wheel 21 and controller wheel 15, whereupon, the work is automatically rotated at a speed determined by the speed of rotation of wheel 15 and is accurately ground by wheel 21, the axial movement of the article through the throat being assisted, if desired, or necessary, by force applied to bar 32 although in many instances the roller mounting of this bar will permit the automatic axial forwarding of the work. The notch 40 provides for enlarged portions of the article 47, such, for instance, as the valve head 48.

If the upper, or work-receiving face, of plate 41 is parallel with those portions of the bar which are supported by the rollers and those portions are in alinement with each other, it is apparent that the horizontal plane of the line of contact of the abrasive wheel with the article will remain constant and the article will be ground into a true cylinder. If, however, the article is raised or lowered, as it proceeds through the throat between the grinding wheel and the controlling wheel, the initial grinding action, at the beginning of the entry of the article into the throat will be greater than it is at the end and the article will be given a conoidal form, the variation from a true cone being proportionate to the cosine of the angle representing the vertical displacement of the article during the grinding operation. It is apparent, therefore, that if the plate 41 be wedge-shaped, as indicated in Fig. 4, or if those portions of bar 32 which contact with the rollers 35 and 38 be not in alinement, the desired shifting of the axis of the article being ground, relative to the axis of the grinding wheel 21 will be obtained and that consequently, the final end of the article will be of larger diameter than the initial end owing to the fact that the final end of the ground portion of the article will be operated upon in a throat which is of greater width than the throat at the beginning of the operation.

When such an operation has been produced, it is apparent that it may be desirable to lift the article vertically out of the throat and, therefore, the operator may, by pressing down upon the outer end of lever 39, lift the bar 32 at one end and thus lift the finished article out of the throat.

Similarly, if an article is to be ground at an intermediate point in its length, it may be lowered into the throat by a reverse operation of the bar 32.

The vertical shiftability of the bar 32 is also important in a case where articles of similar length are to be accurately ground, and by reason of tempering variations, or otherwise, are slightly crooked. If such articles are introduced endwise into the grinding throat, it has been found that their crookedness is not eliminated in a centerless grinding machine of the type disclosed. I have found, however, that such articles having a length say substantially equal to the width of the active face of the grinding element, or more, be inserted into the throat laterally, with a substantial portion of the article opposite the grinding element at the time of insertion, the crookedness of such an article will be eliminated, at least to a major extent, because of the considerable length of simultaneous initial action by the grinding element upon the article. It is apparent, therefore, that with the construction I have here shown, I can introduce such articles laterally into the grinding throat by first raising one end of the bar 32, by a depression of the outer end of lever 39, placing the article to be ground upon the bar in lateral alinement with the throat, and then dropping bar 32 and the article laterally into the throat.

In the particular form of apparatus which I have shown, where the grinding element has a circumferential active face, as distinguished from a conical grinding face, this is an especially convenient arrangement.

The term "circumferential active grinding element," as used in the specification, is not to be understood as being rigidly limited to a precisely cylindrical element, as a considerable degree of conification may be utilized, if desired, the cooperating controller wheel being provided with an active face which, at its active point, will be parallel with the active point of the grinding element. In practice, however, I have found that a substantial cylindrical grinding element and a controller element, having its crown face in a plane substantially at right angles to its axis, gives the most satisfactory results.

I claim as my invention:

1. In a centerless grinder, the combination with a rotative grinding element, a rotative controller element, a longitudinally movable work-support arranged in the throat between said grinding and controller element, means by which said work support may be readily shifted laterally in the throat to and from normal working position, and means by which the work may be shifted laterally relative to the grinding element during axial movement of the work.

2. In a centerless grinder, the combination with a rotative grinding element, a rotative controller element, a longitudinally movable work support arranged in the throat between said grinding and controller elements, and means by which the work-support may be readily shifted laterally in the throat to and from normal working position.

3. In a centerless grinder, the combination with a rotative grinding element, a rotative controller element, a longitudinally movable work support arranged in the throat between said grinding and controller elements, and means by which the work may be shifted laterally relative to the grinding element during axial movement of the work.

4. In a centerless grinder, the combination with a rotative grinding element, a rotative controller element, and a movable work-support arranged in the throat between said grinding and controller elements and movable axially of the work in the throat.

5. In a centerless grinder, the combination of a circumferentially active rotative grinder element, a rotative controller element having an active annular face and having its axis substantially at right angles to the active circumferential face of the grinder element, a longitudinally movable work-support arranged in the throat between the grinder element and controller element, means for relatively adjusting the grinder element, controller element and work-support to form desired work-receiving throats, and means by which the work will be shifted laterally during longitudinal movement.

6. In a centerless grinder, the combination of a circumferentially active rotative grinder element, a rotative controller element having an active annular face, a longitudinally movable work support arranged in the throat between the grinder element and controller element, means for relatively adjusting the grinder element, controller element and work support to form desired work-receiving throats, and means by which the work will be shifted laterally during longitudinal movement.

7. In a centerless grinder, the combination of a circumferentially active rotative grinder element, a rotative controller element having an active annular face, and having its axis substantially at right angles to the active circumferential face of the grinder element, a longitudinally movable work support arranged in the throat between the grinder element and controller element, and means for relatively adjusting the grinder element, controller element and work support to form desired work-receiving throats.

8. In a centerless grinder, the combination of a circumferentially active rotative grinder element, a rotative controller element having an active annular face, a movable work support arranged in the throat between the grinder element and controller element and movable axially of the work in the throat, and means for relatively adjusting the grinder element, controller element and work support to form desired work-receiving throats.

9. In a centerless grinder, the combination of a circumferentially active rotative grinder element, a rotative controller element having an active annular face, and having its axis substantially at right angles to the active circumferential face of the grinder element, a longitudinally movable work support arranged in the throat between the grinder element and controller element, means for relatively adjusting the grinder element, controller element and work support to form desired work-receiving throats, means by which the work will be shifted laterally during longitudinal movement, and means by which the work support may be quickly shifted laterally to and from normal working position in the throat.

10. In a centerless grinder, the combination of a circumferentially active rotative grinder element, a rotative controller element having an active annular face, a longitudinally movable work support arranged in the throat between the grinder element and controller element, means for relatively adjusting the grinder element, controller element and work support to form desired work-receiving throats, means by which the work will be shifted laterally during longitudinal movement, and means by which the work support may be quickly shifted laterally to and from normal working position in the throat.

11. In a centerless grinder, the combination of a circumferentially active rotative grinder element, a rotative controller element having an active annular face, and having its axis substantially at right angles to the active circumferential face of the grinder element, a longitudinally movable work support arranged in the throat between the grinder element and controller element, means for relatively adjusting the grinder element, controller element and work support to form desired work-receiving throats, and means by which the work support may be quickly shifted laterally to and from normal working position in the throat.

12. In a centerless grinder, the combination of a circumferentially active rotative grinder element, a rotative controller element having an active annular face, a longitudinally movable work support arranged in the throat between the grinder element and controller element, means for relatively adjusting the grinder element, controller element and work support to form desired work-receiving throats, and means by which the work support may be quickly shifted laterally to and from normal working position in the throat.

13. In a centerless grinder, the combination of a circumferentially active rotative grinder element, a rotative controller element having an active annular face cooperating with the circumferential active face of the grinder element, a longitudinally movable work support arranged in the throat between the grinder element and the controller element and having a work-supporting face arranged at an angle to its line of longitudinal movement whereby work supported thereon and longitudinally moved through the throat will be also laterally moved relative to the grinder element.

14. In a grinder, the combination with a circumferentially active grinder element, of a longitudinally movable work support arranged in conjunction with said grinder and adapted to rotatively support work to be operated on by the grinder element, means by which the work will be laterally shifted during longitudinal movement of the work support, and means by which said work support may be readily shifted laterally into and out of working position relative to the grinding element.

15. In a grinder, the combination with a circumferentially active grinder element, of a longitudinally movable work support arranged in conjunction with said grinder and adapted to rotatively support work to be operated on by the grinder element, and means by which the work will be laterally shifted during longitudinal movement of the work support.

16. In a grinder, the combination with a circumferentially active rotative grinding element, of means for rotatively supporting and axially shifting and laterally shifting an article to be ground by said grinding element.

In witness whereof, I have hereunto set my hand at Indianapolis, Indiana, this 28th day of July, A. D. one thousand nine hundred and twenty.

MILTON O. REEVES.